United States Patent
Hodatsu et al.

(10) Patent No.: US 8,371,613 B2
(45) Date of Patent: Feb. 12, 2013

(54) PRETENSIONER, SEATBELT RETRACTOR INCLUDING THE PRETENSIONER, AND SEATBELT APPARATUS INCLUDING THE SEATBELT RETRACTOR

(75) Inventors: Yuichiro Hodatsu, Tokyo (JP); Hiroshi Tomita, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/323,647

(22) Filed: Dec. 12, 2011

(65) Prior Publication Data

US 2012/0146319 A1 Jun. 14, 2012

(30) Foreign Application Priority Data

Dec. 13, 2010 (JP) ................... 2010-276998

(51) Int. Cl.
*B60R 22/46* (2006.01)

(52) U.S. Cl. ........................................ 280/806; 242/374

(58) Field of Classification Search .................. 280/806, 280/807; 297/474, 475.374; 242/374; 60/632
See application file for complete search history.

(56) References Cited

U.S. PATENT DOCUMENTS

| 5,881,962 | A * | 3/1999 | Schmidt et al. ............... 242/374 |
| 6,345,504 | B1 * | 2/2002 | Takehara et al. ............... 60/638 |
| 6,363,722 | B1 * | 4/2002 | Takehara et al. ............... 60/632 |
| 6,419,176 | B1 * | 7/2002 | Mizuno ......................... 242/374 |
| 6,722,600 | B2 * | 4/2004 | Hamaue et al. ............... 242/374 |
| 7,631,831 | B2 * | 12/2009 | Hiramatsu .................... 242/374 |
| 2010/0084906 | A1 * | 4/2010 | Burrow et al. ................ 297/476 |
| 2011/0140502 | A1 * | 6/2011 | Shiotani et al. ............... 297/475 |

FOREIGN PATENT DOCUMENTS

| JP | 2001-163182 | 6/2001 |
| JP | 2001-233172 | 8/2001 |
| JP | 2010-036651 | 2/2010 |
| JP | 2010-036881 | 2/2010 |
| WO | WO-2010/084687 A1 | 7/2010 |

* cited by examiner

*Primary Examiner* — Paul N Dickson
*Assistant Examiner* — Robert A Coker
(74) *Attorney, Agent, or Firm* — Foley & Lardner LLP

(57) ABSTRACT

A pipe includes a cutout portion through which levers of a ring gear enter the pipe. An inner peripheral surface of the pipe opposing the cutout portion includes a curved inner peripheral surface in a curved portion of the pipe, a linear inner peripheral surface in a linear portion of the pipe, and a transition portion from the curved inner peripheral surface to the linear inner peripheral surface. The transition portion is located closer to a position where balls start to press the levers of the ring gear, than an intersection where an imaginary straight line α extending from a cutout end portion of the cutout portion intersects an imaginary extension line of the inner peripheral surface of the linear portion of the pipe at a right angle.

3 Claims, 8 Drawing Sheets

F I G. 1
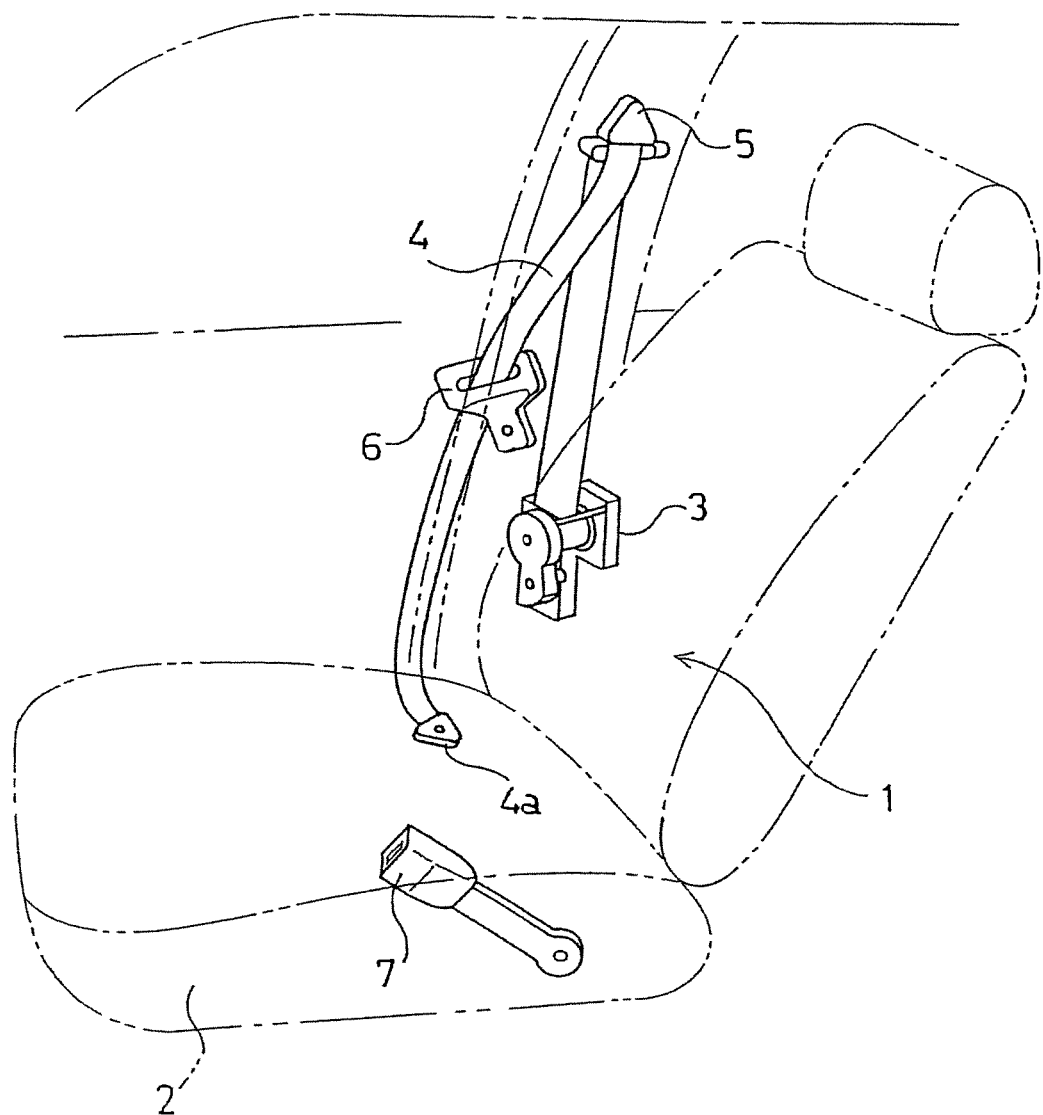

(a)

(b)

PRETENSIONER, SEATBELT RETRACTOR INCLUDING THE PRETENSIONER, AND SEATBELT APPARATUS INCLUDING THE SEATBELT RETRACTOR

BACKGROUND

The present invention belongs to a technical field of a pretensioner provided in a seatbelt retractor for retracting a seatbelt and using a plurality of force transmission members formed by balls, a technical field of a seatbelt retractor, and a technical field of a vehicle seatbelt apparatus.

For seatbelt apparatuses to be mounted in vehicles such as automobiles, a variety of seatbelt retractors including a pretensioner have been developed. At the beginning of an emergency, such as a vehicle collision, in which a deceleration higher than the normal deceleration is applied to a vehicle, a pretensioner rotates a spool of a seatbelt retractor in a seatbelt retracting direction by using reactant gas generated in a gas generator, thereby retracting a seatbelt on the spool. This quickly takes up slack in the seatbelt and applies tension to the seatbelt so as to increase the occupant restraint force.

As an example of a pretensioner of the related art, a pretensioner is known in which a plurality of force transmission members formed by balls are stored in a pipe, these force transmission members are moved along the interior of the pipe by force of reactant gas generated by a gas generator in case of an emergency so as to press a plurality of pressed portions of a ring gear formed by levers, so that the ring gear is rotated to rotate a spool in a seatbelt retracting direction (for example, see PTL 1, WO/2010/084687, which is incorporated by reference herein).

In the pretensioner described in PTL 1, to be pressed by the plurality of force transmission members formed by balls, the plurality of pressed portions of the ring gear need to enter a moving path of the force transmission members in the pipe. For this reason, as illustrated in FIG. 8, a narrow and long cutout portion 102 extending in a longitudinal direction of a pipe 101 is provided in the pipe 101, and pressed portions 104 of a ring gear 103 enter a moving path of force transmission members 105 in the pipe 101 through the cutout portion 102. In this type of pretensioner, the outer diameter of the force transmission members is set to be smaller than the inner diameter of the pipe 101 so that the force transmission members can move smoothly.

SUMMARY

The pipe 101 along which the force transmission members 105 are guided is routed in a curved form in relation to the arrangement space. In this case, the pipe 101 is formed as a linear portion 101a at a position where the force transmission members 105 press the pressed portions 104 of the ring gear 103, and is formed as a curved portion 101b connected to the linear portion 101a on the upstream side in the moving direction of the force transmission members 105. The cutout portion 102 is provided in an inner peripheral surface 101e located on an inner side of the curved portion 101b of the pipe 101. An inner peripheral surface 101c located on an outer side of the curved portion 101b of the pipe 101 has a transition portion P from the curved portion 101b to the linear portion 101a. This transition portion P is located closer to a gas generator side (side opposite a position where the force transmission members 105 start to press the pressed portions 104 of the ring gear 103) than an intersection Q where an imaginary straight line a extending from an end of the cutout portion 102 intersects the linear portion 101a of the pipe 101 at a right angle.

However, since the outer diameter of the force transmission members 105 is smaller than the inner diameter of the pipe 101, one force transmission member 105a sometimes separates from the inner peripheral surface 101c of the pipe 101, as illustrated in FIG. 8. Then, when the transition portion P is closer to the gas generator side than the intersection Q, as described above, the force transmission members 105 adjacent to the force transmission member 105a on the front and rear sides contact with the force transmission member 105a at positions shifted from the center of the force transmission member 105a toward the inner peripheral surface 101c of the pipe 101. For this reason, the force transmission member 105a receives, from the force transmission members 105 adjacent thereto on the front and rear sides, a force having a component toward the right in FIG. 8, that is, toward the cutout portion 102 of the pipe 101. Since this force is relatively great and the strength of a portion 101d of the pipe 101 near the cutout portion 102 is relatively low, the force transmission member 105a may deform the portion 101d of the pipe 101 and come out from the cutout portion 102. If the force transmission member 105a thus deforms the portion 101d of the pipe 101 and comes out from the cutout portion 102, energy loss of the force transmission members 105 occurs, and the energy is not efficiently transmitted to the pressed portions 104 of the ring gear 103. This reduces the working amount of the pretensioner.

The present invention has been made in view of such circumstances, and an object of the invention is to provide a pretensioner that can increase the working amount by efficiently transmitting energy of a plurality of transmission members to a ring gear for rotating a spool, a seatbelt retractor including the pretensioner, and a seatbelt apparatus including the seatbelt retractor.

To overcome the above-described problems, a pretensioner according to the present invention includes a pipe; a plurality of force transmission members movably provided in the pipe and formed by balls that transmit a force for rotating a spool in a seatbelt retracting direction; a gas generator that generates gas in case of an emergency; a ring gear that is at least rotatable and has a plurality of internal teeth on an inner periphery and a plurality of pressed portions on an outer periphery; and a pinion that is provided in a spool-side member, has external teeth meshed with the internal teeth, and rotates the spool. In case of the emergency, the force transmission members press the pressed portions of the ring gear so as to rotate the spool in the seatbelt retracting direction. The pipe has a cutout portion through which the pressed portions of the ring gear enter the pipe. An inner peripheral surface of the pipe opposing the cutout portion includes a linear inner peripheral surface provided at a position where the force transmission members press the pressed portions of the ring gear, and linearly extending in a longitudinal direction of the pipe, a curved inner peripheral surface connected to the linear inner peripheral surface on an upstream side in a moving direction of the force transmission members, and a transition portion from the curved inner peripheral surface to the linear inner peripheral surface. The transition portion is located closer to a position where the force transmission members start to press the pressed portions of the ring gear, than an intersection where an imaginary straight line extending from a cutout end portion of the cutout portion intersects an imaginary extension line of the linear inner peripheral surface at a right angle.

A seatbelt retractor according to the present invention includes at least a seatbelt; a spool that retracts the seatbelt; and a pretensioner that rotates the spool in a seatbelt retracting direction in case of an emergency. The pretensioner is the above-described pretensioner of the present invention.

Further, a seatbelt apparatus according to the present invention includes at least a seatbelt retractor that retracts a seatbelt; a tongue slidably supported by the seatbelt; and a buckle provided in a vehicle body such that the tongue is engageably and disengageably retained by the buckle. The seatbelt retractor is the above-described seatbelt retractor of the present invention.

According to the pretensioner and the seatbelt retractor of the present invention having these configurations, the inner peripheral surface of the pipe opposing the cutout portion, through which the pressed portions of the ring gear enter the pipe, includes the linear inner peripheral surface provided at the position where the force transmission members press the pressed portions of the ring gear, the curved inner peripheral surface connected to the linear inner peripheral surface on the upstream side in the moving direction of the force transmission members, and the transition portion from the curved inner peripheral surface to the linear inner peripheral surface. The transition portion is located closer to the position where the force transmission members start to press the pressed portions of the ring gear, than the intersection where the imaginary straight line extending from the cutout end portion of the cutout portion intersects the imaginary extension line of the linear inner peripheral surface at a right angle. This can prevent the force transmission member located at the cutout portion from being pressed toward the cutout portion by the force transmission members provided on the front and rear sides. That is, it is possible to restrain the force transmission member from deforming the portion of the pipe near the cutout portion and to restrain the force transmission member from coming out from the cutout portion.

Therefore, energy loss of the force transmission members can be suppressed, and the energy of the force transmission members can be efficiently transmitted to the pressed portions of the ring gear. As a result, the working amount of the pretensioner can be increased.

Further, according to the seatbelt apparatus of the present invention, the working amount of the pretensioner can be increased by efficiently transmitting the energy of the force transmission members to the ring gear. Hence, it is possible to effectively enhance the occupant restraint performance of the seatbelt using the operation of the pretensioner.

BRIEF DESCRIPTION OF DRAWINGS

FIG. 1 schematically illustrates a seatbelt apparatus including a seatbelt retractor according to an embodiment of the present invention.

DETAILED DESCRIPTION

Figure 2:
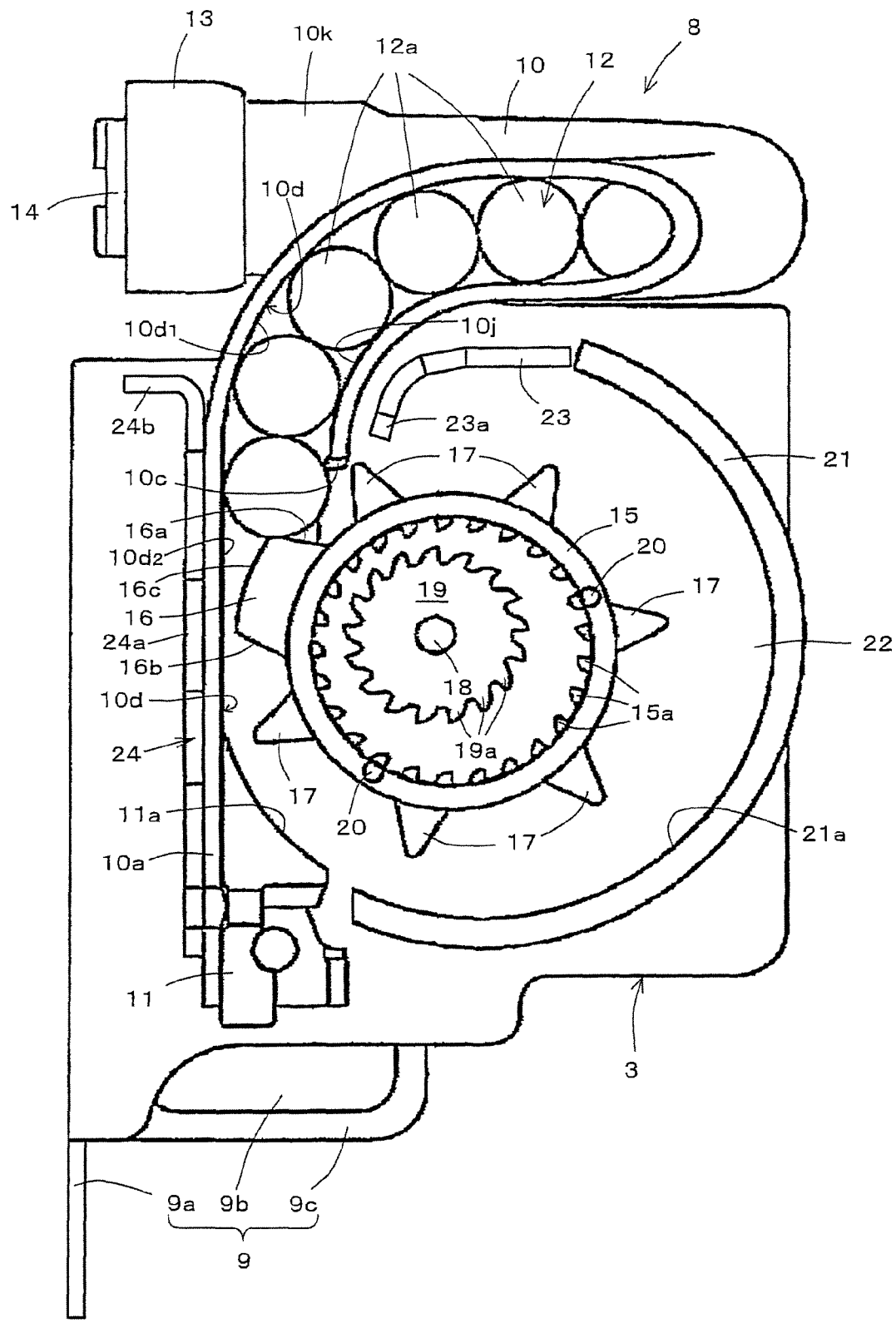
FIG. 2 is a partial cutaway side view of the seatbelt retractor of the embodiment illustrated in FIG. 1.

An embodiment of the present invention will be described below with reference to the drawings.

FIG. 1 schematically illustrates a seatbelt apparatus including a seatbelt retractor according to an embodiment of the present invention.

As illustrated in FIG. 1, a seatbelt apparatus 1 of this embodiment is basically the same as a known three-point type seatbelt apparatus. In the figure, reference numeral 1 denotes a seatbelt apparatus, reference numeral 2 denotes a vehicle seat, reference numeral 3 denotes a seatbelt retractor provided near the vehicle seat 2, and reference numeral 4 denotes a seatbelt that can be withdrawably retracted by the seatbelt retractor 3 and that has at its tip a belt anchor 4a fixed to the floor of the vehicle body or the vehicle seat 2. Reference numeral 5 denotes a guide anchor that guides the seatbelt 4 withdrawn from the seatbelt retractor 3 toward the shoulder of an occupant, reference numeral 6 denotes a tongue slidably supported by the seatbelt 4 guided from the guide anchor 5, and reference numeral 7 denotes a buckle fixed to the floor of the vehicle body or the vehicle seat in a manner such that the tongue 6 is engageably and disengageably inserted in and engaged with the buckle 7.

Operations of fastening and unfastening the seatbelt 4 in the seatbelt apparatus 1 are identical to those adopted in known seatbelt apparatuses.

The seatbelt retractor 3 of the embodiment is a known emergency locking seatbelt retractor (ELR) or a known automatic locking seatbelt retractor (ALR). The seatbelt retractor 3 includes a pretensioner. Similarly to known pretensioners, the pretensioner starts operation in case of an emergency when a deceleration much higher than the deceleration in a normal running state is applied, for example, in a vehicle collision, rotates a spool 26 (illustrated in below-described FIG. 6) of the seatbelt retractor 3 in a seatbelt retracting direction, and retracts the seatbelt 4 by a predetermined amount, thereby increasing the occupant restraint force.

FIG. 2 is a partial cutaway side view of the seatbelt retractor including the pretensioner of the embodiment.

As illustrated in FIG. 2, a pretensioner 8 of the embodiment is supported by a frame 9 of the seatbelt retractor 3. The frame 9 includes a base portion 9a located on an inner side of the vehicle cabin (left side in FIG. 2) and mounted on the vehicle body, and a pair of side walls 9b and 9c bent from the base portion 9a.

The pretensioner 8 includes a pipe 10, and a guide member 11 is provided at a distal end portion 10a of the pipe 10. The distal end portion 10a of the pipe 10 and the guide member 11 are mounted by an appropriate fixing member, such as a bolt, on a pipe mount portion 24 fixed to the side wall 9b. In the distal end portion 10a of the pipe 10, a cutout portion 10c that communicates between the interior and exterior of the pipe 10 and extends in a longitudinal direction of the pipe 10 is provided in an inner peripheral surface 10j on an inner side of a curved portion 10b.

In the pipe 10, a plurality of force transmission members 12 including a plurality of balls 12a formed of metal, such as iron or aluminum, and an unillustrated piston for pressing the balls 12a with received gas pressure are movably provided in contact with each other. In this case, an outer diameter of all the balls 12a is set to be slightly smaller than an inner diameter of the pipe 10. A pipe-shaped pressure vessel 13 is connected to a proximal end portion 10k of the pipe 10. The pressure vessel 13 is provided with a gas generator 14.

The pretensioner 8 includes a case body 27 (illustrated in below-described FIG. 6), and the case body 27 is mounted on the side wall 9b. In the case body 27, a ring gear 15 is provided rotatably and movably to the right in FIG. 2. The ring gear 15 has a plurality of internal teeth 15a on its inner peripheral surface. A part of the ring gear 15 can enter the pipe 10 through the cutout portion 10c provided in the distal end portion 10a of the pipe 10.

Figure 3:
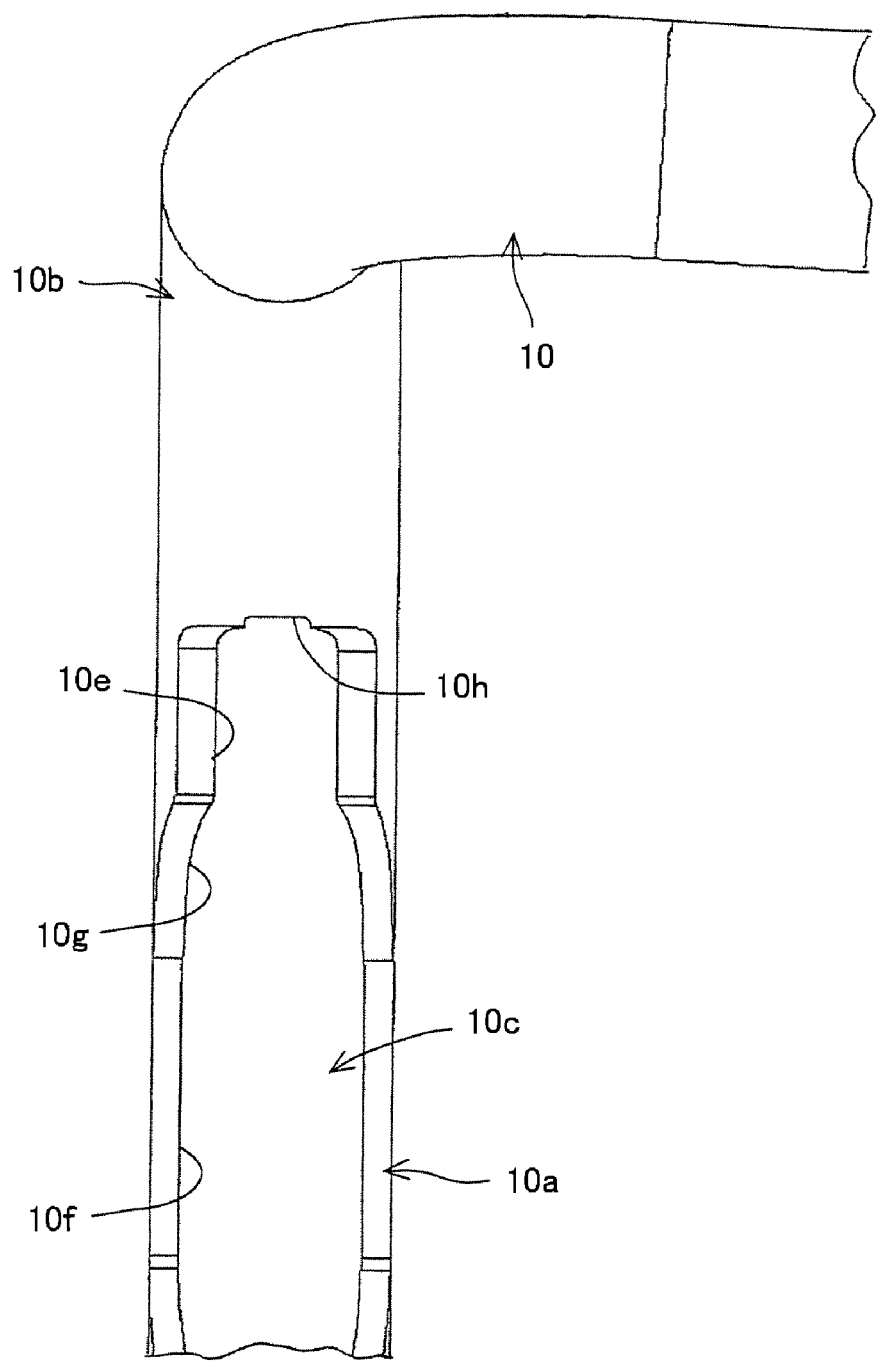
FIG. 3 illustrates a cutout portion of a pipe used in a pretensioner of the seatbelt retractor of the embodiment illustrated in FIG. 2.

As illustrated in FIG. 3, the cutout portion 10c at the distal end portion of the pipe 10 includes a narrow portion 10e, a wide portion 10f, an inclined portion 10g, and a cutout end portion 10h. The narrow portion 10e is provided at a gas generator 14 side, and the wide portion 10f is provided at a position where the balls 12a start to contact with levers 17 of the ring gear 15.

One substantially arc-shaped stopper 16 (corresponding to a pressed portion of the present invention) and a plurality of (six in the illustrated embodiment) substantially triangular levers 17 (corresponding to a pressed portion of the present invention) project from an outer peripheral surface of the ring gear 15. The stopper 16 includes an outer peripheral edge portion 16c which has a predetermined length in a circumferential direction and with which a leading first ball 12a is in contact in a normal state (in a non-operation state of the pretensioner 8). In this case, a distance in the circumferential direction between one circumferential end of the stopper 16 and a lever 17 adjacent to the one circumferential end and a distance in the circumferential direction between the other circumferential end of the stopper 16 and a lever 17 adjacent to the other circumferential end are set to be enough to receive a part of one ball 12a. A distance in the circumferential direction between each of the plurality of levers 17 and two levers 17 adjacent thereto is set to be enough to partially receive two balls 12a in contact with each other. Further, the outer peripheral edge portion 16c of the stopper 16 and tips of all the levers 17 are located on or nearly on a circumference of a circle concentric with the circle of the ring gear 15. The widths (more specifically, widths in an axial direction of the ring gear 15) of the stopper 16 and all the levers 17 are equal or substantially equal. Also, the widths of the stopper 16 and all the levers 17 are set to be smaller than the width of the cutout portion 10c of the pipe 10. Therefore, the stopper 16 and all the levers 17 can enter the pipe 10 through the cutout portion 10c.

On a rotation shaft 18 (corresponding to a spool-side member of the present invention) of a locking base (not illustrated) of the seatbelt retractor 3, a pinion 19 is mounted corotatably with the rotation shaft 18 (although not illustrated, the pinion 19 may be corotatably mounted on a rotation shaft of the spool 26). The locking base is provided in a known ELR or ALR. That is, the locking base corotates with the spool 26 of the seatbelt retractor 3 for retracting the seatbelt 4 in a normal state, and rotation thereof is locked by a lock mechanism that is actuated in case of an emergency when a great deceleration is applied to the vehicle, for example, in a vehicle collision, thereby preventing rotation of the spool 26 in a seatbelt withdrawing direction. An ELR including a pretensioner using a plurality of balls and a locking base is described in known patent literatures, for example, Japanese Unexamined Patent Application Publication No. 2001-233172. A detailed description of the operation of the locking base is skipped since the operation can be understood with reference to Japanese Unexamined Patent Application Publication No. 2001-233172, which is incorporated by reference herein.

The pinion 19 has a plurality of external teeth 19a. The internal teeth 15a of the ring gear 15 are able to mesh with the external teeth 19a of the pinion 19. When the pretensioner 8 is actuated, the balls 12a press the stopper 16 and the levers 17, which enter the pipe 10 through the cutout portion 10c of the pipe 10, from above, thereby applying rotational driving force to the ring gear 15 in a seatbelt retracting direction (counterclockwise in FIG. 2) and translatory moving force toward the pinion 19 to the ring gear 15. Therefore, a force transmission unit in which the force transmission members 12 formed by the balls 12a transmit the rotational driving force and the translatory moving force to the ring gear 15 is provided in the cutout portion 10c of the pipe 10.

In a normal state (in a non-operation state of the pretensioner 8), the ring gear 15 is held by shear pins 20 at a non-working position illustrated in FIG. 2. At the non-working position of the ring gear 15, the internal teeth 15a are not meshed with the external teeth 19a, but are separate from the external teeth 19a. Therefore, rotation of the pinion 19 (that is, the spool 26) is not influenced by the ring gear 15. In case of an emergency when the pretensioner 8 is actuated, the shear pins 20 are subjected to shear fracture by the rotational driving force and translatory moving force applied from the force transmission members 12 to the ring gear 15 in the force transmission unit, and the ring gear 15 is placed at a working position illustrated in FIG. 7(a). At the working position of the ring gear 15, the internal teeth 15a are meshed with the external teeth 19a. Therefore, rotation of the pinion 19 (that is, the spool 26) is influenced by the ring gear 15.

In a state in which the pretensioner 8 of the embodiment is mounted on the vehicle body, the pipe 10 is routed such that the distal end portion 10a is located at the lowermost position, the pipe 10 linearly extends upward from the distal end portion 10a, and the force transmission unit in the cutout portion 10c is substantially horizontal to the rotation center point of the pinion 19 (that is, the spool 26). Thus, the balls 12a transmit forces to the ring gear 15 in the seatbelt retracting direction in a substantially tangential direction of the ring gear 15. As a result, the balls 12a most efficiently transmit the forces to the ring gear 15.

Further, the pipe 10 is bent at a substantially right angle around an upper end of the base portion 9a of the frame 9, and linearly and substantially horizontally extends toward the outer side of the vehicle cabin, is bent at a substantially right angle near an end of the side wall 9b opposite the base portion 9a and linearly and substantially horizontally in a vehicle front-rear direction, and is also bent at a substantially right angle near an end of the base portion 9a in the vehicle front-rear direction and linearly extends toward the inner side of the vehicle cabin such as to slightly slope upward from the horizontal direction. Therefore, the pipe 10 is bent three-dimensionally. The pressure vessel 13 and the gas generator 14 are provided nearly above the base portion 9a such as to extend slightly upward toward the inner side of the vehicle cabin.

Figure 4:
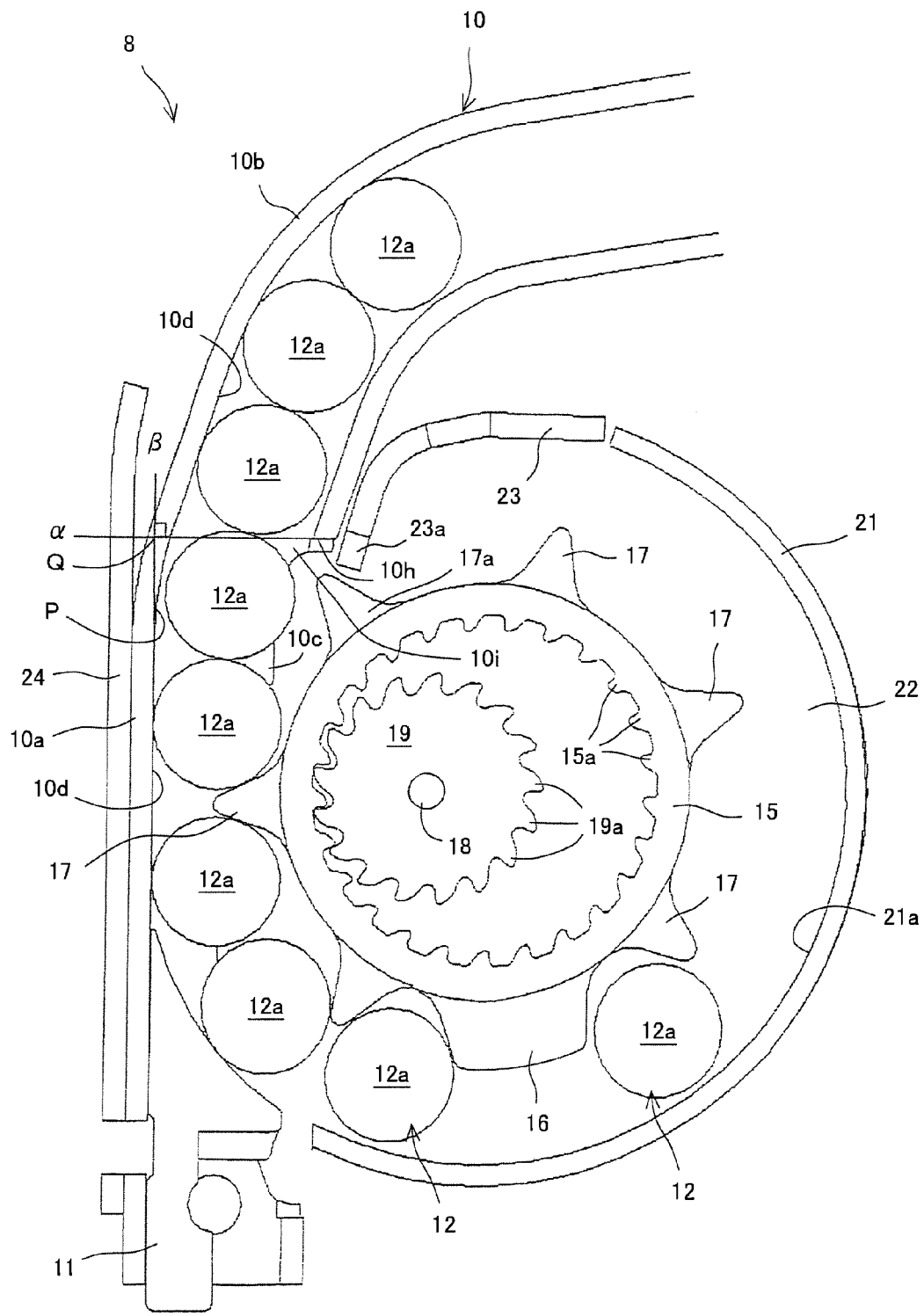
FIG. 4 illustrates the shape of the pipe used in the pretensioner of the embodiment illustrated in FIG. 2.

Similarly to the above-described related art, as illustrated in FIG. 4, at a position where the balls 12a start to press the corresponding levers 17 of the ring gear 15 in the force transmission unit, the pipe 10 is formed as a linear portion 10a linearly extending in the longitudinal direction of the pipe 10, and a portion connected to the linear portion 10a on an upstream side in the moving direction of the balls 12a serves as a curved portion 10b curved in the longitudinal direction of the pipe 10. Therefore, an inner peripheral surface 10d of the pipe 10 on an outer side of the curved portion 10b of the pipe 10 (that is, an inner peripheral surface opposing the cutout portion 10c) includes a curved inner peripheral surface $10d_1$ curved at the curved portion 10b in the longitudinal direction of the pipe 10, and a linear inner peripheral surface $10d_2$ linearly extending in the longitudinal direction of the pipe 10 in the linear portion 10a. Thus, the inner peripheral surface 10d of the pipe 10 has a transition portion P from the curved inner peripheral surface of the curved portion 10b to the linear inner peripheral surface of the linear portion 10a. The transition portion P is located closer to the position where the balls 12a start to press the levers 17 of the ring gear 15 (a side opposite the gas generator 14) than an intersection Q where an imaginary straight line α extending from the cutout end portion 10h of the cutout portion 10c intersects an imaginary extension line β of the inner peripheral surface 10d of the linear portion 10a of the pipe 10 at a right angle.

Figure 5:
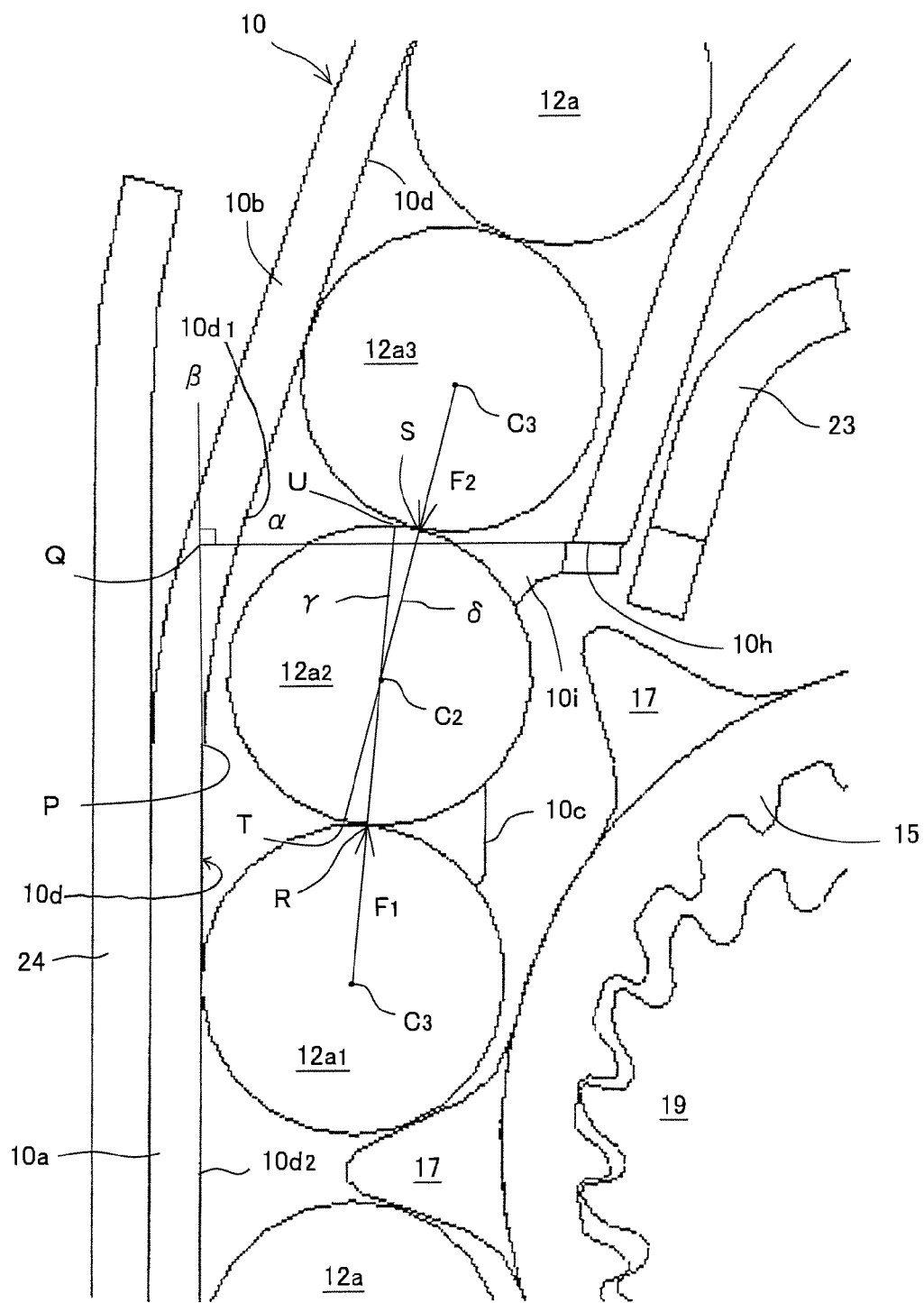
FIG. 5 illustrates the behavior of balls in the pipe having the shape illustrated in FIG. 4.

As illustrated in FIG. 5, it is here assumed that a first ball $12a_1$ (it is not limited to a ball 12a that first presses the ring gear 15, but is a leading one $12a_1$ of three balls $12a_1$, $12a_2$, and $12a_3$ illustrated in FIG. 5, this also applies to second and third balls) presses a lever 17 of the ring gear 15, a second ball $12a_2$ presses the first ball $12a_1$, and a third ball $12a_3$ presses the second ball $12a_2$. In this case, it is also assumed that the second ball $12a_2$ is maximally moved toward the cutout portion 10c and is separate from the inner peripheral surface 10d of the pipe 10.

When the second ball $12a_2$ is going to move through the transition portion P from the curved portion 10b to the linear portion 10a of the pipe 10 in this state, a reaction force $F_1$ is applied from the first ball $12a_1$ to the second ball $12a_2$, and a pressing force $F_2$ is also applied thereto from the third ball $12a_3$. In this case, the reaction force $F_1$ acts on a point of action R of the second ball $12a_2$ on a straight line γ connecting a center c1 of the first ball $12a_1$ and a center $c_2$ of the second ball $12a_2$. The pressing force $F_2$ acts on a point of action S of the second ball $12a_2$ on a straight line δ connecting the center c2 of the second ball $12a_2$ and a center $c_3$ of the third ball $12a_3$. The point of action R of the reaction force $F_1$ is located closer to the cutout portion 10c than a point T of the second ball $12a_2$ where the straight line S intersects an outer peripheral surface of the second ball $12a_2$ opposite the point of action S. Further, the point of action S of the pressing force $F_2$ is located closer to the cutout portion 10c than a point U of the second ball $12a_2$ where the straight line γ intersects the outer peripheral surface of the second ball $12a_2$ opposite the point of action R. Thus, even when the second ball $12a_2$ separates from the inner peripheral surface 10d of the pipe 10, it is pressed by the first and third balls $12a_1$ and $12a_3$ toward the inner peripheral surface 10d of the pipe 10 opposite the cutout portion 10c. Therefore, the second ball $12a_2$ is restrained from deforming a portion 10i of the pipe 10 near the cutout portion 10c, and the second ball $12a_2$ is also restrained from coming out from the cutout portion 10c.

Figure 7:
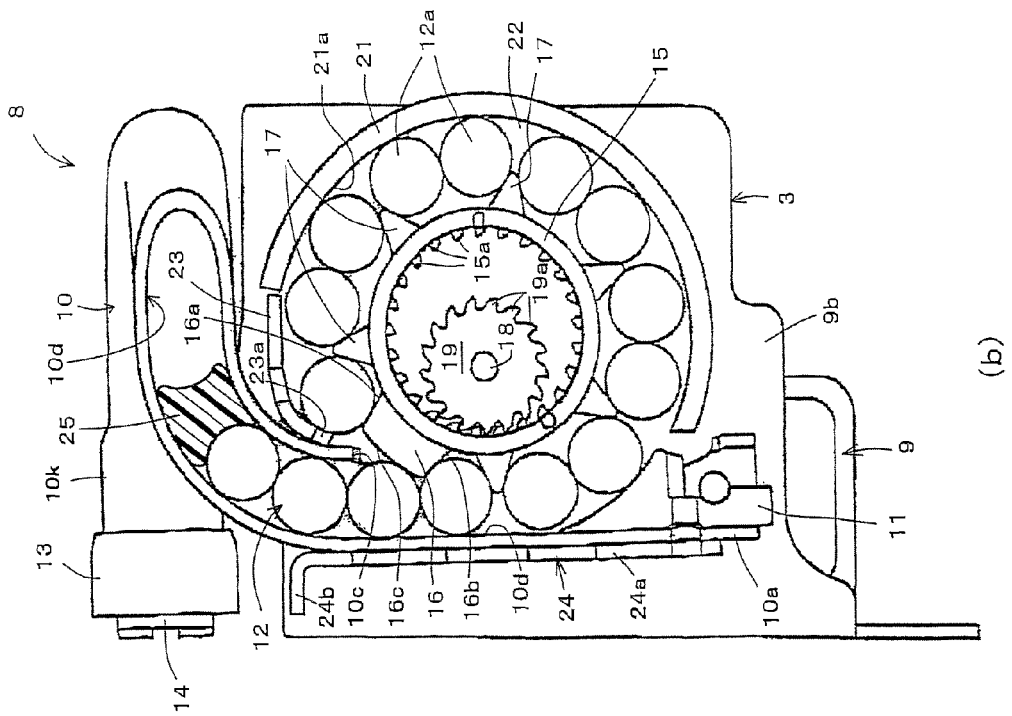
FIG. 7(a) illustrates a state during operation of the pretensioner of the embodiment illustrated in FIG. 1.
FIG. 7(b) illustrates a state of the pretensioner at the completion of operation.
Figure 7:
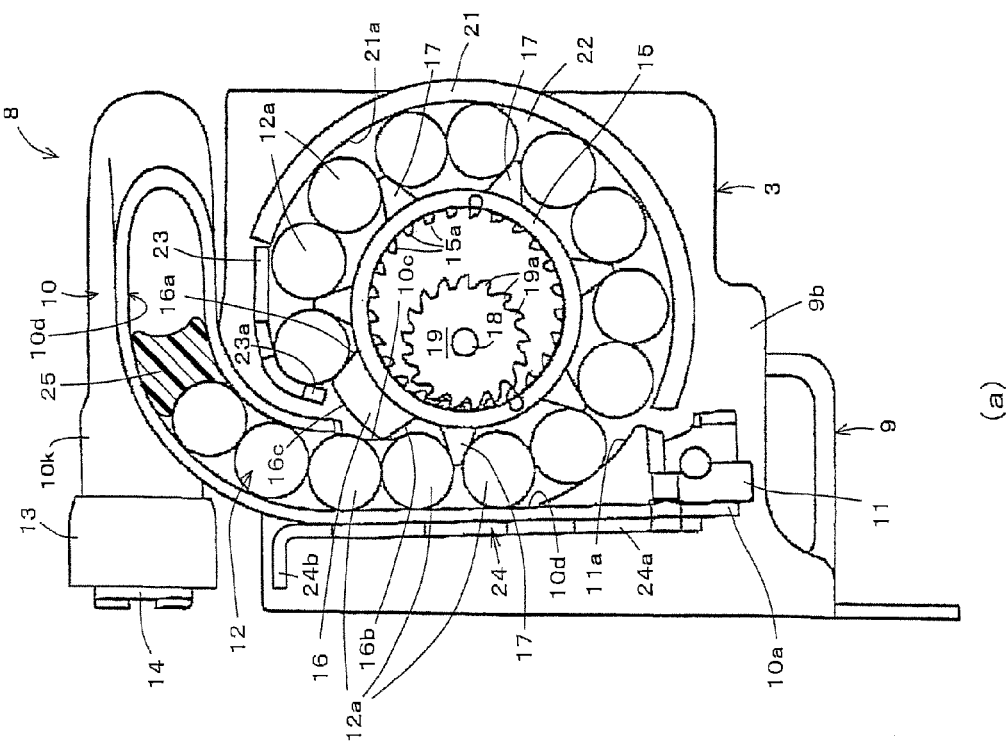
Figure 8:
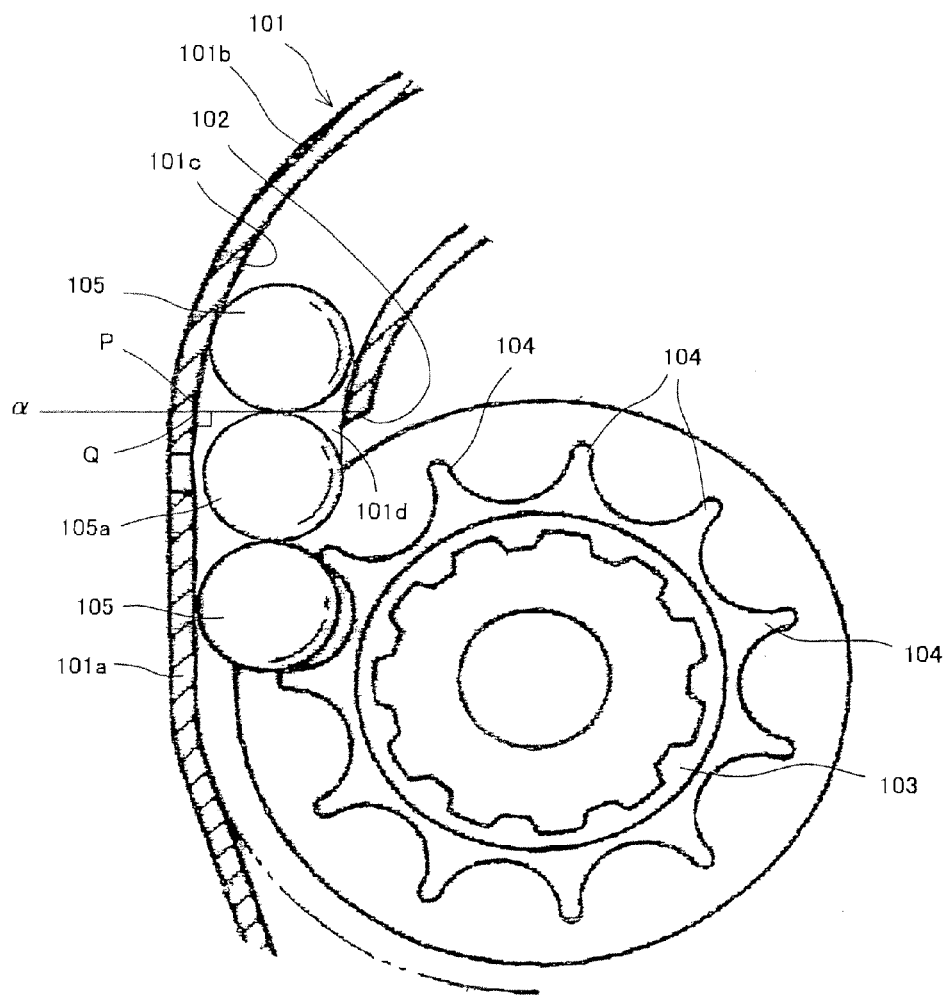
FIG. 8 illustrates the operation of a pretensioner of the related art described in PTL 1.

The case body 27 of the pretensioner 8 includes a guide wall 21 having an arc-shaped guide surface 21a for guiding the balls 12a. The guide wall 21 forms a guide groove 22 that guides the balls 12a. The guide groove 22 is shaped like an arc of a circle concentric or substantially concentric with the center of the ring gear 15 in a state in which the ring gear 15 is moved to the right in FIG. 2 and the internal teeth 15a of the ring gear 15 are meshed with the external teeth 19a of the pinion 19, as illustrated in FIG. 7(a). The guide member 11 has an arc-shaped guide surface 11a, and the guide surface 11a is substantially located on one curved surface together with the guide surface 21a. Therefore, the guide surface 11a smoothly guides the balls 12a from the pipe 10 to the guide groove 22 at a connecting portion between the guide groove 22 and the pipe 10.

Further, a guide wall 23 is provided in the case body 27 of the pretensioner 8 and is located adjacent to an end of the arc-shaped guide wall 21 opposite the guide member 11. The guide wall 23 is substantially J-shaped such that an end thereof opposite the guide wall 21 is curved (when viewed in a state in which the left side in FIG. 2 is down). The curved end serves as a stopper 23a of the case body 27 with which the leading ball 12a can contact. The stopper 23a is deformable such that, when the leading ball 12a contacts with the stopper 23a, an end of the stopper 23a is moved to the left in FIG. 2 by pressing force from the leading ball 12a. Therefore, such deformation of the stopper 23a reduces impact applied from the ball 12a to the stopper 23a. That is, the stopper 23a functions as an impact reducing member. The guide wall 23 may be provided integrally with the pipe 10.

Figure 6:
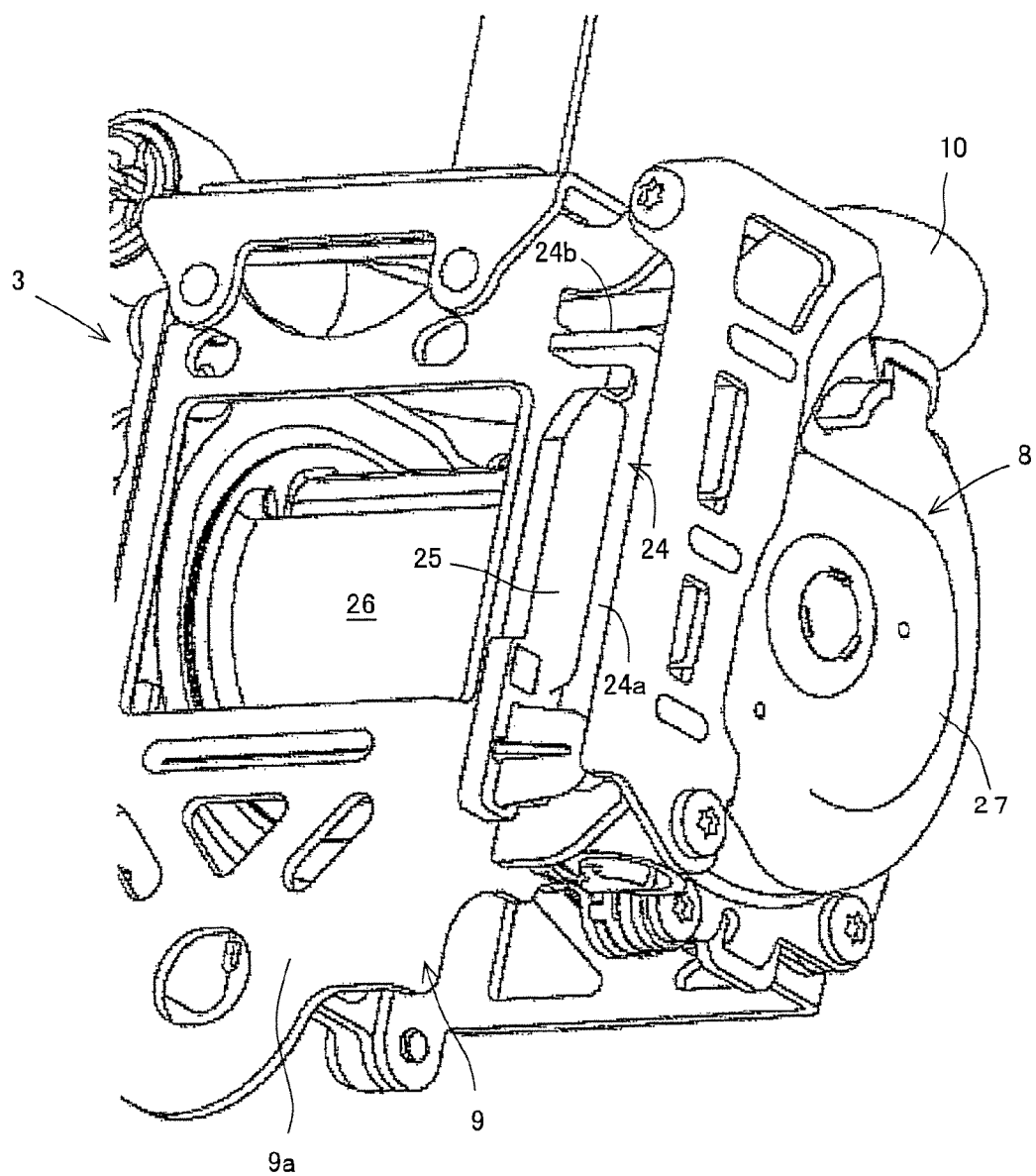
FIG. 6 is a perspective view of a rib for reinforcing a pipe mount portion in the pretensioner of the embodiment illustrated in FIG. 2.

As illustrated in FIGS. 2 and 6, the pipe mount portion 24 is formed by an L-shaped flat plate including a long side portion 24a and a short side portion 24b formed by bending an upper end of the long side portion 24a nearly at a right angle. The pipe 10 is mounted and fixed to one surface of the long side portion of the pipe mount portion 24. The short side portion 24b is provided in contact with the side wall 9b of the frame 9. The short side portion 24b prevents the pipe mount portion 24 from tilting when the outer peripheral edge portion 16c of the stopper 16 presses the balls 12a at the end of operation of the pretensioner 8. In particular, since the pipe mount portion 24 is fixed at a lower end to the guide member 11 and a position where the outer peripheral edge portion 16c of the stopper 16 presses the pipe mount portion 24 via the balls 12a is located at an upper end of the pipe mount portion 24, when the short side portion 24b is provided at the upper end of the long side portion 24a, the pressing force of the outer peripheral edge portion 16c of the stopper 16 is supported efficiently. Thus, the pipe mount portion 24 is effectively prevented from tilting and deforming when the outer peripheral edge portion 16c of the stopper 16 presses the pipe mount portion 24.

A rib 25 shaped like a flat plate linearly extending in the up-down direction is fixed to the other surface of the long side portion of the pipe mount portion 24 opposite the surface to which the pipe 10 is fixed. The rib 25 is provided at a position to counteract the pressing force when the outer peripheral edge portion 16c of the stopper 16 presses the balls 12a at the end of operation of the pretensioner 8. Since the rib 25 reinforces the pipe mount portion 24, deformation of the pipe mount portion 24 is prevented when the outer peripheral edge portion 16c of the stopper 16 presses the balls 12a.

A description will be given of the operation of the pretensioner 8 of the embodiment having such a configuration. The description will be given of the operation of the pretensioner 8 performed in a state in which the occupant wears the seatbelt apparatus.

The pretensioner 8 of the embodiment basically operates in the same manner as that adopted in the pretensioner of the related art using a plurality of balls until the pretensioner 8 starts to rotate the spool 26 of the seatbelt retractor 3 in the seatbelt retracting direction in case of an emergency when a great deceleration is applied to the vehicle, for example, in a vehicle collision.

That is, as illustrated in FIG. 2, the ring gear 15 is at a non-working position in a non-operation state of the pretensioner 8. Therefore, the ring gear 15 is held in a state in which the internal teeth 15a are not meshed with the external teeth 19a of the pinion 19. Also, the ring gear 15 is held in a state in which the leading first ball 12a is in contact with an upstream side edge 16a of the stopper 16 in a ring-gear rotating direction (the rotating direction of the ring gear 15 corresponds to a counterclockwise direction in FIG. 2, that is, the seatbelt retracting direction). Further, the subsequent balls 12a are in contact with the adjacent balls 12a. In this case, the gas generator 14 does not generate gas, and the balls 12a do substantially not press the stopper 16 of the ring gear 15.

In case of the above-described emergency, the gas generator 14 starts to generate gas, and the generated gas applies a great pressing force to the balls 12a via the unillustrated piston. This pressing force is transmitted to the first ball 12a. Then, since the stopper 16 of the ring gear 15 is pressed by the first ball 12a, the shear pins 20 are subjected to shear fracture, whereby the ring gear 15 is moved to the right in FIG. 2 and rotated counterclockwise by the pressing force applied via the first ball 12a. Also, as illustrated in FIG. 7(a), the internal teeth 15a of the ring gear 15 mesh with the external teeth 19a of the pinion 19, and the pinion 19 starts to rotate in the same direction as the ring gear 15. Thus, the rotation shaft 18, that is, the spool 26 starts to rotate in the seatbelt retracting direction, and retraction of the seatbelt 4 worn by the occupant starts.

The first ball 12a is received between the stopper 16 and the first lever 17 located on the upstream side of the stopper 16 in the ring-gear rotating direction, and the next second ball 12a comes into contact with the next lever 17 adjacent to the first lever 17 on the upstream side in the ring-gear rotating direction. Therefore, the second and third balls 12a press the next lever 17 similarly. The pressing force applied to the next lever 17 via the second and third balls 12a further rotates both the ring gear 15 and the pinion 19 counterclockwise. Thus, the seatbelt 4 is further retracted on the spool 26. In this case, the pressing force of the first ball 12a for the stopper 16 is substantially lost.

Two balls, namely, the second and third balls 12a are received between the first lever 17 and the second lever 17. Next, the fourth ball 12a comes into contact with a subsequent lever 17 adjacent to the next lever 17 on the upstream side in the ring-gear rotating direction. That is, the fourth and fifth balls 12a further press the subsequent lever 17 similarly. The pressing force applied to the subsequent lever 17 via the fourth and fifth balls 12a further rotates both the ring gear 15 and the pinion 19 counterclockwise. Thus, the seatbelt 4 is further retracted on the spool 26. In this case, the pressing force of the second and third balls 12a for the lever 17 is substantially lost.

After that, the sixth ball 12a and subsequent balls 12a sequentially press the levers 17 similarly, and therefore, both the ring gear 15 and the pinion 19 further rotate counterclockwise. Thus, the seatbelt 4 is further retracted on the spool 26.

The balls 12a, whose pressing forces for the stopper 16 and the levers 17 are substantially lost, move along the guide groove 22 with the rotation of the ring gear 15 while being received between the stopper 16 and the lever 17 or between the adjacent levers 17. Then, as illustrated in FIG. 7(a), the first ball 12a comes into contact with the stopper 23a of the case body 27. In this case, a side edge 16b of the stopper 16 of the ring gear 15 on the downstream side in the ring-gear rotating direction is not in contact with the opposing ball 12a.

When the first ball 12a comes into contact with the stopper 23a, the stopper 23a is deformed by the pressing force of the first ball 12a and the ring gear 15 further rotates counterclockwise, as illustrated in FIG. 7(b). By this deformation of the stopper 23a, kinetic energy of the balls 12a is absorbed partially. By the further counterclockwise rotation of the ring gear 15, the outer peripheral edge 16c of the stopper 16 of the ring gear 15 is brought into contact with the opposing ball 12a, as illustrated in FIG. 7(b), and the opposing ball 12a is clamped between the outer peripheral edge 16c of the stopper 16 and the inner peripheral surface 10d of the pipe 10 opposite the cutout portion 10c.

Since the clamping force for the ball 12a produced by the rotating force of the ring gear 15 (that is, the pressing force of the stopper 16 for the ball 12a) is increased by a wedge effect between the outer peripheral edge 16c of the stopper 16 and the inner peripheral surface 10d of the pipe 10, the contact force (pressing force) of the outer peripheral edge 16c of the stopper 16 with the ball 12a increases. This wedge effect is exerted because the distance between the outer peripheral edge 16c of the stopper 16 and the inner peripheral surface 10d of the pipe 10 gradually decreases in the moving direction of the ball 12a (that is, in the rotating direction of the ring gear 15). While the pressing force of the outer peripheral edge 16c of the stopper 16 for the ball 12a is supported by the pipe mount portion 24, even when the pressing force increases, the pipe mount portion 24 is prevented from being deformed by the pressing force since the pipe mount portion 24 is reinforced by the rib 25.

By the above-described wedge effect, movement of the ball 12a is disenabled and rotation of the ring gear 15 is stopped. Therefore, rotations of the pinion 19 and the spool 26 are stopped, retraction of the seatbelt with the spool 26 is finished, and the operation of the pretensioner 8 is completed. By retracting the seatbelt 4 with the pretensioner 8, the occupant restraint force of the seatbelt 4 is increased. In this case, the relationship between the rotation amount of the ring gear 15 and the rotation amount of the spool 26 (that is, the seatbelt retraction amount of the spool 26) is determined by appropriately setting the gear ratio between the internal teeth 15a of the ring gear 15 and the external teeth 19a of the pinion 19.

When the rotation of the ring gear 15 stops, the movements of the second and subsequent balls 12a also stop. In this case, the gas pressure of gas generated in the pipe 10 is low. In such a state in which the balls 12a are stopped, most of the balls 12a are located along the outer peripheral surface of the ring gear 15, and the remaining balls 12a and the piston are located in the pipe 10.

Another operation of the pretensioner 8 of the embodiment is substantially the same as the operation of the conventional pretensioner using a plurality of balls. Further, another operation of the seatbelt retractor 3 of the embodiment is also substantially the same as the operation of the conventional ELR or ALR.

According to the pretensioner 8 and the seatbelt retractor 3 of the embodiment, the transition portion P between the inner peripheral surface 10d of the linear portion 10a of the pipe 10 at the position where the balls 12a press the corresponding levers 17 of the ring gear 15, and the inner peripheral surface 10d of the curved portion 10b connected to the linear portion 10a on the upstream side in the moving direction of the balls 12a is located closer to the side where the balls 12a start to press the levers 17 of the ring gear 15 (side opposite the gas generator 14) than the intersection Q where the imaginary straight line a extending from the cutout end portion 10h of the cutout portion 10c intersects the imaginary extension line of the inner peripheral surface 10d of the linear portion 10a of the pipe 10 at a right angle. This can prevent the ball 12a located at the cutout portion 10c from being pressed toward the cutout portion 10c by the balls 12a adjacent thereto on the front and rear sides. That is, the ball 12a is restrained from deforming the portion 10i of the pipe 10 near the cutout portion 10c, and the ball $12a_2$ is restrained from coming out of the cutout portion 10c.

Therefore, loss of the energy of the balls 12a can be suppressed, and the energy of the balls 12a can be efficiently transmitted to the stopper 16 and the levers 17 of the ring gear 15. As a result, the working amount of the pretensioner 8 can be increased.

The rib 25 is provided on the other surface of the long side portion of the pipe mount portion 24 opposite the surface to which the pipe 10 is fixed, and at the position to counteract the pressing force of the outer peripheral edge 16c of the stopper 16 for the ball 12a at the end of the operation of the pretensioner 8. Hence, the pipe mount portion 24 can be prevented from being deformed when the outer peripheral edge 16c of the stopper 16 presses the ball 12a.

Further, according to the seatbelt apparatus 1 having the seatbelt retractor 3 of the embodiment, energy of the balls 12a can be efficiently transmitted to the ring gear 15 so as to increase the working amount of the pretensioner 8. Hence, the occupant restraint performance of the seatbelt 4 using the operation of the pretensioner 8 can be enhanced effectively.

The pretensioner and the seatbelt retractor according to the present invention are not limited to the above-described embodiment, and various design variations are possible. For example, the ring gear 15 does not always need to have the arc-shaped stopper 16, and the present invention is also applicable to a pretensioner that does not have the arc-shaped stopper 16, for example, the pretensioner described in PTL 1 or a pretensioner described in Japanese Unexamined Patent Application Publication No. 2001-163182 (incorporated by reference herein) cited as the prior art literature in PTL 1. In short, various design variations are possible within the scope set forth in the claims of the invention.

The pretensioner, the seatbelt retractor, and the seatbelt apparatus according to the present invention are suitably applied to a pretensioner provided in a seatbelt retractor for retracting a seatbelt and using a plurality of force transmission members, a seatbelt retractor, and a vehicle seatbelt apparatus.

The invention claimed is:

1. A pretensioner comprising: a pipe; a plurality of force transmission members movably provided in the pipe and formed by balls that transmit a force for rotating a spool in a seatbelt retracting direction; a gas generator that generates gas in case of an emergency; a ring gear that is at least rotatable and has a plurality of internal teeth on an inner periphery and a plurality of pressed portions on an outer periphery; and a pinion that is provided in a spool-side member, has external teeth meshed with the internal teeth, and rotates the spool, wherein, in case of the emergency, the force transmission members press the pressed portions of the ring gear so as to rotate the spool in the seatbelt retracting direction,
    wherein the pipe has a cutout portion through which the pressed portions of the ring gear enter the pipe,
    wherein an inner peripheral surface of the pipe opposing the cutout portion includes a linear inner peripheral surface provided at a position where the force transmission members press the pressed portions of the ring gear, and linearly extending in a longitudinal direction of the pipe, a curved inner peripheral surface connected to the linear inner peripheral surface on an upstream side in a moving direction of the force transmission members, and a transition portion from the curved inner peripheral surface to the linear inner peripheral surface, and
    wherein the transition portion is located closer to a position where the force transmission members start to press the pressed portions of the ring gear than an intersection where an imaginary straight line extending from a cutout end portion of the cutout portion intersects an imaginary extension line of the linear inner peripheral surface at a right angle.

2. A seatbelt retractor comprising at least: a seatbelt; a spool that retracts the seatbelt; and a pretensioner that rotates the spool in a seatbelt retracting direction in case of an emergency,
    wherein the pretensioner is the pretensioner according to claim 1.

3. A seatbelt apparatus comprising at least: a seatbelt retractor that retracts the seatbelt; a tongue slidably supported by the seatbelt; and a buckle provided in a vehicle body such that the tongue is engageably and disengageably retained by the buckle,
    wherein the seatbelt retractor is the seatbelt retractor according to claim 2.

* * * * *